(12) United States Patent
Zheng et al.

(10) Patent No.: US 8,737,846 B2
(45) Date of Patent: May 27, 2014

(54) DYNAMIC-GRID COMB OPTICAL SOURCE

(75) Inventors: Xuezhe Zheng, San Diego, CA (US);
Ying Luo, San Diego, CA (US);
Guoliang Li, San Diego, CA (US);
Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 137 days.

(21) Appl. No.: 13/361,873

(22) Filed: Jan. 30, 2012

(65) Prior Publication Data
US 2013/0195446 A1  Aug. 1, 2013

(51) Int. Cl.
*H04B 10/12* (2011.01)
*G02B 6/26* (2006.01)
*G02B 5/18* (2006.01)

(52) U.S. Cl.
USPC ............... 398/201; 398/182; 385/15; 385/37; 359/558; 359/570

(58) Field of Classification Search
None
See application file for complete search history.

(56) References Cited

U.S. PATENT DOCUMENTS

| | | | | |
|---|---|---|---|---|
| 6,061,158 A * | 5/2000 | DeLong | ........................ | 398/196 |
| 6,192,170 B1 * | 2/2001 | Komatsu | ........................ | 385/15 |
| 6,768,841 B2 * | 7/2004 | He | ................................. | 385/37 |
| 7,304,797 B2 * | 12/2007 | Balakrishnan et al. | ........ | 359/572 |
| 2003/0194179 A1 * | 10/2003 | Rumpf et al. | ................... | 385/37 |
| 2011/0280579 A1 * | 11/2011 | McLaren et al. | ................ | 398/79 |

FOREIGN PATENT DOCUMENTS

EP  1006683 A2  6/2000

OTHER PUBLICATIONS

Krishnamoorthy, A. V. et al. "Exploiting CMOS Manufacturing to Reduce Tuning Requirements for Resonant Optical Devices", IEEE Photonics Journal and IEEE Photonics Society Publication, vol. 3 No. 3, Jun. 2011.
Shih-Hsiang Hsu, "InGaAs detector array integrated with AIGaAs/GaAs grating demultiplexer by total internal reflector", Electronics Letters, IEE Stevenage, GB, vol. 35, No. 15, Jul. 22, 1999, XP006012428, pp. 1248-1249.
J.B.D. Soole, "Monolithic WDM Sources and Detectors for the Long Wavelength Fiber Band Based on an InP Grating Multiplexer/Demultiplexer", LEOS 92, Conference proceedings, IEEE Lasers and electro-optics Societh, 1992, New York, NY, Nov. 16, 1992, XP010103170, pp. 690-691.

* cited by examiner

*Primary Examiner* — Ken Vanderpuye
*Assistant Examiner* — Merlin Brito Peguero
(74) *Attorney, Agent, or Firm* — Park, Vaughan, Fleming & Dowler LLP; Steven E. Stupp (57) ABSTRACT

An optical source uses feedback to maintain a substantially fixed spacing between adjacent wavelengths in a set of wavelengths in a wavelength comb output by the optical source. In particular, a set of light sources in the optical source provide optical signals having the set of wavelengths. Moreover, the optical signals are output at diffraction angles of an optical device in the optical source (such as an echelle grating), and optical detectors in the optical source determine optical metrics associated with the optical signals. Furthermore, control logic in the optical source provides control signals to the set of light sources based on the determined optical metrics.

20 Claims, 6 Drawing Sheets

DYNAMIC-GRID COMB OPTICAL SOURCE

GOVERNMENT LICENSE RIGHTS

This invention was made with Government support under Agreement No. HR0011-08-9-0001 awarded by DARPA. The Government has certain rights in the invention.

BACKGROUND

1. Field

The present disclosure relates to techniques for communicating optical signals. More specifically, the present disclosure relates to an optical source that uses feedback to maintain a substantially fixed spacing between adjacent wavelengths produced by the optical source.

2. Related Art

Silicon photonics is a promising technology that can provide large communication bandwidth, low latency and low power consumption for inter-chip and intra-chip connections. In the last few years, significant progress has been made in developing low-cost components for use in inter-chip and intra-chip silicon-photonic connections, including: high-bandwidth efficient silicon modulators, low-loss optical waveguides, wavelength-division-multiplexing (WDM) components, and high-speed CMOS optical-waveguide photodetectors. However, a suitable low-cost WDM optical source, such as a multi-wavelength laser source, remains a challenge and, in its absence, poses an obstacle to implementing WDM silicon-photonic links.

In particular, traditional WDM links operate on a predefined wavelength grid with fixed channel spacing, such as that specified by International Telecommunication Union (ITU) standard, ITU-T G.694.1. As a consequence, existing WDM optical sources, such as lasers, used in these traditional WDM links are tuned and locked to the predefined wavelength grid. However, wavelength control for such existing WDM optical sources is typically quite complicated. For example, air-gap etalon filters are often used in the existing WDM optical sources to implement wavelength locking These air-gap etalon filters are usually bulky, and therefore are not suitable for integration or for use in WDM silicon-photonic links in which there may be thousands of integrated WDM optical sources.

Hence, what is needed is an optical source without the above-described problems.

SUMMARY

One embodiment of the present disclosure provides an optical source. This optical source includes a set of light sources that output optical signals having a set of wavelengths with a substantially fixed spacing, where a given light source outputs a given optical signal having a given wavelength in the set of wavelengths, and the set of wavelengths constitutes a wavelength comb. Moreover, an optical combiner in the optical source combines the optical signals. Furthermore, an optical device in the optical source, which includes a diffraction grating on a curved surface, images and diffracts the optical signals using a reflective geometry and outputs the optical signals at corresponding diffraction angles of the diffraction grating, thereby maintaining the wavelength comb. Additionally, optical detectors in the optical source determine optical metrics associated with the optical signals output at the diffraction angles, where a given optical detector determines a given optical metric associated with the given optical signal. Control logic in the optical source provides control signals to the set of light sources based on the optical metrics, thereby maintaining a substantially fixed spacing between adjacent wavelengths in the set of wavelengths.

Note that an incidence angle associated with the given diffraction order of the optical device may be different than a diffraction angle associated with the given diffraction order. For example, the optical device may include an echelle grating. Moreover, a grating pitch of the diffraction grating may be greater than 20 μm.

Furthermore, the set of light sources may include a laser and/or a light emitting diode.

In some embodiments, the optical combiner includes cascaded 2×1 optical combiners in which two inputs are combined into an output.

Additionally, the optical detectors may include power monitors.

Note that the control signals may adjust gains, phases and emitting wavelengths of the set of light sources, thereby substantially maintaining registration of the wavelengths in the wavelength comb output by the optical device. For example, the set of light sources may include ring resonators having resonant wavelengths, and the control signals may adjust the source emitting wavelengths by adjusting the resonant wavelengths.

Another embodiment provides a system that includes the optical source.

Another embodiment provides a method for providing optical signals, which may be performed using the optical source. During operation, the set of light sources outputs optical signals having a set of wavelengths with a substantially fixed spacing, where a given light source outputs a given optical signal having a given wavelength in the set of wavelengths, and the set of wavelengths constitutes a wavelength comb. Then, the optical combiner combines the optical signals. Moreover, the optical device images and diffracts the combined optical signals using a reflective geometry, where the optical device includes a diffraction grating on a curved surface, and the optical device outputs the optical signals at corresponding diffraction angles of the diffraction grating, thereby maintaining the wavelength comb. Next, the optical detectors determine optical metrics associated with the optical signals output at the diffraction angles, where a given optical detector determines a given optical metric associated with the given optical signal. Furthermore, the control logic provides control signals to the set of light sources based on the optical metrics, thereby maintaining a substantially fixed spacing between adjacent wavelengths in the set of wavelengths.

BRIEF DESCRIPTION OF THE FIGURES

Table 1 provides design parameters for an echelle grating in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of an optical source, a system that includes the optical source, and a technique for providing optical signals are described. This optical source uses feedback to maintain a substantially fixed spacing between adjacent wavelengths in a set of wavelengths in a wavelength comb output by the optical source. In particular, a set of light sources in the optical source provide optical signals having the set of wavelengths. Moreover, the optical signals are output at diffraction angles of an optical device in the optical source (such as an echelle grating), and optical detectors in the optical source determine optical metrics associated with the optical signals. Furthermore, control logic in the optical source provides control signals to the set of light sources based on the determined optical metrics.

By providing a wavelength comb with substantially fixed spacing between adjacent wavelengths, the optical source may allow a compact, energy-efficient, low-cost, multi-wavelength optical source to be implemented for use in a variety of applications, such as high-speed communication in a wavelength-division-multiplexing (WDM) silicon-photonic link. Consequently, the optical source may help facilitate high-speed inter- and intra-chip silicon-photonic interconnects, as well as associated systems that can include this component (such as high-performance computing systems).

We now describe embodiments of the optical source. Wavelength control of an existing WDM optical source, such as a laser, typically involves control of the driving current, tuning of a wavelength filter in the lasing cavity, and fine-tuning the phase of the lasing cavity using a feedback signal obtained from wavelength monitoring of the laser light. In the discussion that follows, a wavelength comb is provided by a WDM optical source that includes feedback control of a set of light sources and an optical device that functions as a precise optical de-multiplexer that is insensitive to and, thus, maintains accurate spacing of adjacent wavelengths output by the WDM optical source.

Figure 1:
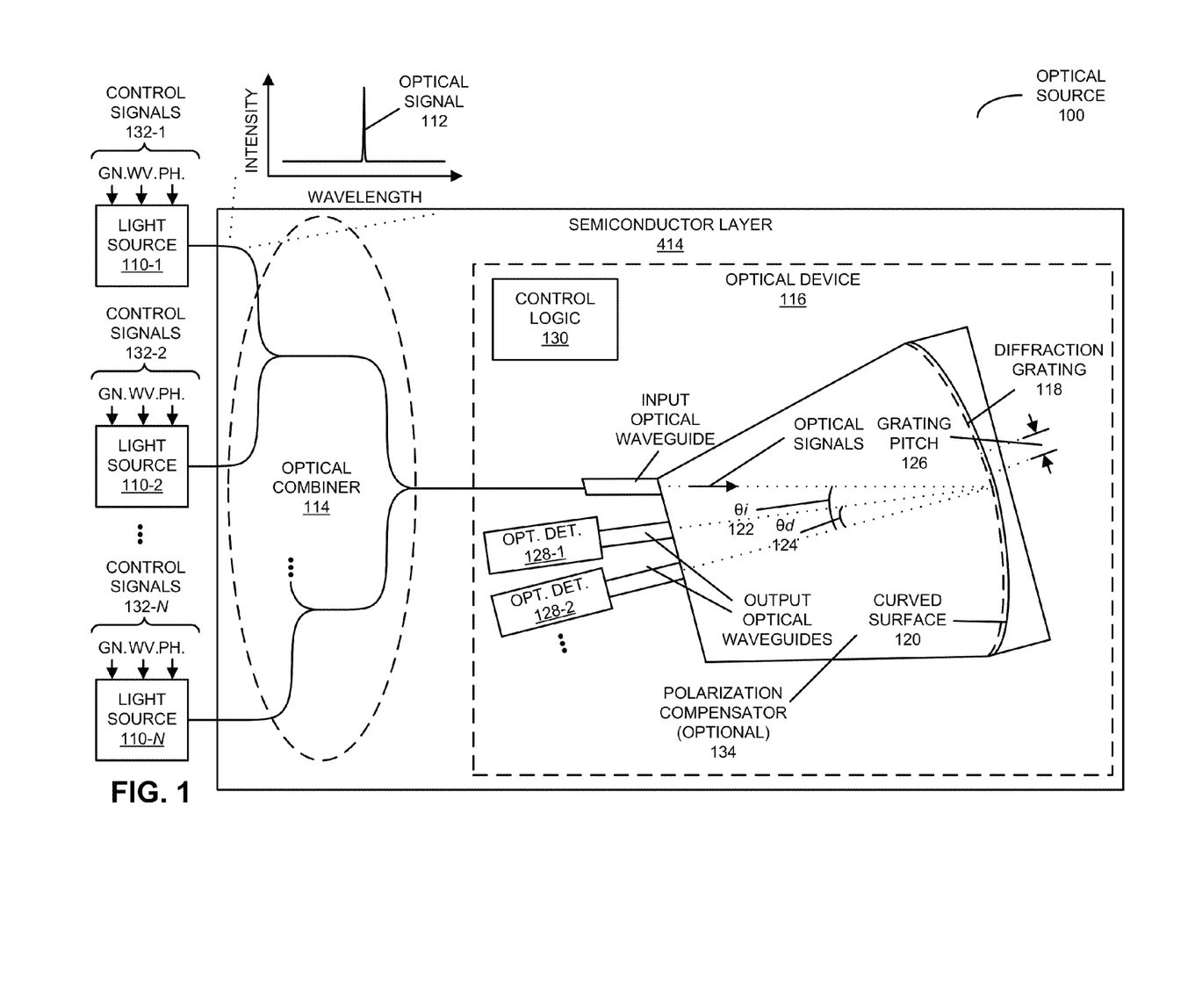
FIG. 1 is a block diagram illustrating a dynamic-grid comb optical source in accordance with an embodiment of the present disclosure.

The WDM optical source is shown FIG. 1, which presents a block diagram illustrating a dynamic-grid comb optical source 100. This optical source includes a set of light sources 110 that output optical signals (such as optical signal 112) having a set of wavelengths with a substantially fixed spacing (such as carrier wavelengths for use in optical channels in an optical link or WDM), where a given light source outputs a given optical signal having a given wavelength in the set of wavelengths, and the set of wavelengths constitutes a wavelength comb. For example, set of light sources 110 may include a laser and/or a light emitting diode, and the optical signals may be output from monitoring ports of set of light sources 110.

Moreover, an optical combiner 114 in optical source 100 combines the optical signals. This optical combiner may include cascaded 2×1 optical combiners (such as Y-junction power combiners) in which two inputs are combined into an output.

Furthermore, an optical device 116 in optical source 100, which includes a diffraction grating 118 on a curved surface 120, provides the optical de-multiplexer. In particular, optical device 116 images and diffracts the optical signals using a reflective geometry and outputs the optical signals at corresponding diffraction angles of diffraction grating 118, thereby maintaining the wavelength comb with accurate spacing between adjacent wavelengths.

Note that an incidence angle ($\theta_i$) 122 associated with the given diffraction order of optical device 116 may be different than a diffraction angle ($\theta_d$) 124 associated with the given diffraction order. Moreover, a grating pitch 126 of diffraction grating 118 may be greater than 20 µm.

In an exemplary embodiment, optical device 116 includes an echelle grating. The linear dispersion (LD) of an echelle grating can be expressed as $$LD = \frac{2R}{\lambda} \frac{(\sin\theta_i + \sin\theta_d)}{\cos\theta_d} \frac{n_g}{n_{\mathit{eff}}} \quad (1)$$

where R is the Roland circle radius of optical device 116, λ is a center wavelength in the set of wavelengths, $n_g$ is the group index of refraction, and $n_{\mathit{eff}}$ is the effective index of refraction of a layer (such as a semiconductor layer 414) in optical device 116 that conveys the optical signals. Alternatively, LD is defined as $$\frac{p}{s} \quad (2)$$

where p is grating pitch 126 and s is the substantially fixed spacing in the wavelength comb. From Eqns. 1 and 2, s can be re-expressed as $$\frac{\lambda}{2R} \frac{p\cos\theta_d}{(\sin\theta_i + \sin\theta_d)} \frac{n_{\mathit{eff}}}{n_g}. \quad (3)$$

Moreover, using Eqn. 3 the variation in the substantially fixed spacing (δs) can be approximated as $$\frac{\delta s}{s} = \frac{\delta\lambda}{\lambda} + \frac{\delta n_{\mathit{eff}}}{n_{\mathit{eff}}} \quad (4)$$

Note that the first term on the right-hand side of Eqn. 4 is typically small (e.g., less than 1%). If the optical signals are conveyed in a silicon layer, $n_{\mathit{eff}}$ and s can vary by up to a few percent because of manufacturing variations and/or ambient temperature change. However, because s is relatively small (e.g., 1.6 nm), the magnitude of δs is also very small. Therefore, even if λ is not maintained as accurately, very accurate and stable spacing between adjacent wavelengths in the wavelength comb can be achieved.

By accurately imaging and diffracting the optical signals in this way, optical device 116 can facilitate monitoring of the set of wavelengths and, thus, feedback-control adjustment of set of light sources 110. In particular, optical detectors 128 in optical source 100 may determine optical metrics associated with the optical signals output at diffraction angles (such as diffraction angle 124), where a given optical detector determines a given optical metric associated with the given optical signal. For example, optical detectors 128 may include power monitors and/or an array of photo-detectors that amplify and monitor the light (or a portion of the light) in output optical waveguides at the diffraction angles, thereby providing tracking signals for the set of wavelengths and/or the wavelength comb.

Additionally, control logic 130 in optical source 100 provides control signals 132 to set of light sources 110 based on the optical metrics, thereby maintaining the substantially fixed spacing between adjacent wavelengths in the set of wavelengths (i.e., the wavelengths in the wavelength comb can be locked to a grid with accurate spacing). For example, control signals 132 may adjust gains (GN.), phases (PH.) and/or emitting wavelengths (WV.) of set of light sources 110. Note that these adjustments may be independent of each other.

In some embodiments, optical source 100 includes an optional polarization compensator 134 proximate to optical device 116, where optional polarization compensator 134 compensates for variation in a polarization of optical signals.

While the center wavelength λ in the preceding embodiment may not be maintained as accurately as the substantially fixed spacing s, after fabrication of optical source 100 it may be approximately fixed as long as a temperature of a substrate (on which at least a portion of optical source 100 is implemented) does not vary significantly. Thus, the wavelength comb provided by optical source 100 may not require absolute wavelength registration. This may be useful in communication applications in which inter-operability is often not necessary, such as WDM silicon-photonic links with point-to-point topologies.

Figure 2:
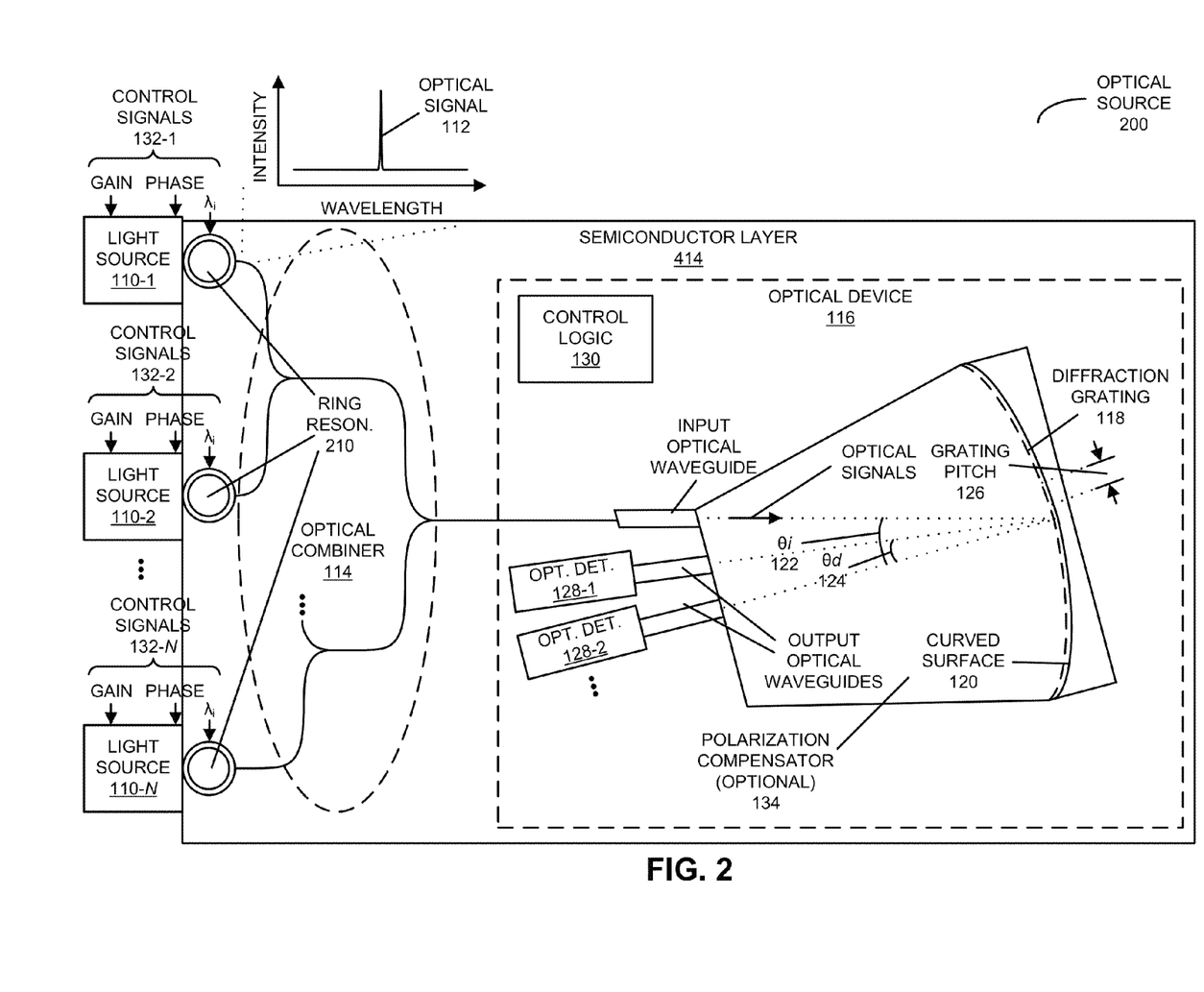
FIG. 2 is a block diagram illustrating a dynamic-grid comb optical source in accordance with an embodiment of the present disclosure.

However, in some embodiments the set of wavelengths can also be adjusted using feedback based on the determined optical metrics. For example, control signals 132 may adjust the set of wavelengths of the optical signals output by set of light sources 110, thereby substantially maintaining registration of the wavelengths in the wavelength comb output by optical source 100. In particular, as shown in FIG. 2, which presents a block diagram illustrating a dynamic-grid comb optical source 200, set of light sources 110 may include ring resonators 210 having resonant wavelengths, and control signals 132 may adjust the carrier wavelengths by adjusting the resonant wavelengths (and, thus, the gain peaks of set of light sources 110).

In some embodiments, resonant wavelengths of ring resonators 210 are offset from each other, thereby providing a synthetic wavelength comb. In these embodiments, a desired output wavelength comb from optical source 200 can be obtained by adjusting ring resonators 210 so that their resonant wavelengths match or align with nearest wavelengths in the set of wavelengths. As long as the substantially fixed spacing is maintained, this low-energy approach can track or compensate for variations in the center wavelength λ.

Note that in WDM silicon-photonic links, the synthetic wavelength comb may also be adjusted downstream (for example, in receivers) to track or compensate for wavelength variations associated with intervening WDM components, such as multiplexers/de-multiplexers or add/drop filters. In some embodiments, the synthetic wavelength comb allows wavelength spacing in which one or more standby or spare wavelengths are available either out of the working wavelength band or in between the nominal operating wavelengths. For example, there may be two or more wavelength combs having the same, substantially fixed spacing, which are offset from each other, thereby providing an alternate wavelength comb as a spare.

Figure 3:
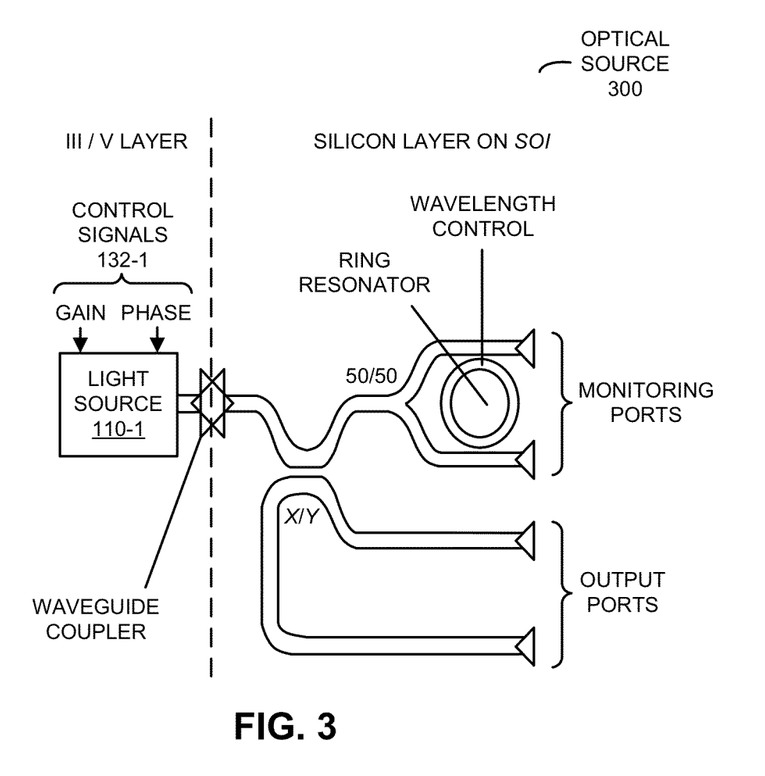
FIG. 3 is a block diagram illustrating a hybrid optical source that includes a ring reflector in accordance with an embodiment of the present disclosure.

As shown in FIG. 3, which presents a block diagram illustrating a hybrid optical source 300, in some embodiments the dynamic-grid comb optical source includes a III-V/silicon hybrid integrated laser. The III-V section may include a gain region, a phase-tuning region, a high reflectivity mirror in one end, and an output coupler (such as an etched mirror facet) on the other end. For example, the III-V section may be implemented in an active optical waveguide. This active optical waveguide may be optically coupled to a passive silicon optical waveguide (which, as described below with reference to FIG. 4, may be implemented using silicon-on-insulator or SOI technology). Furthermore, the passive silicon optical waveguide may include ring resonator that functions as a tunable wavelength-selective mirror, as well as a directional coupler as a lasing output device.

Note that the output port of the ring resonator can be used as the monitoring port, which may be connected to optical device 116 (FIGS. 1 and 2) for wavelength control via 2×1 optical combiners in optical combiner 114 (FIGS. 1 and 2). Alternatively or additionally, a small portion of the light can be tapped directly from the output port for wavelength monitoring.

Figure 4:
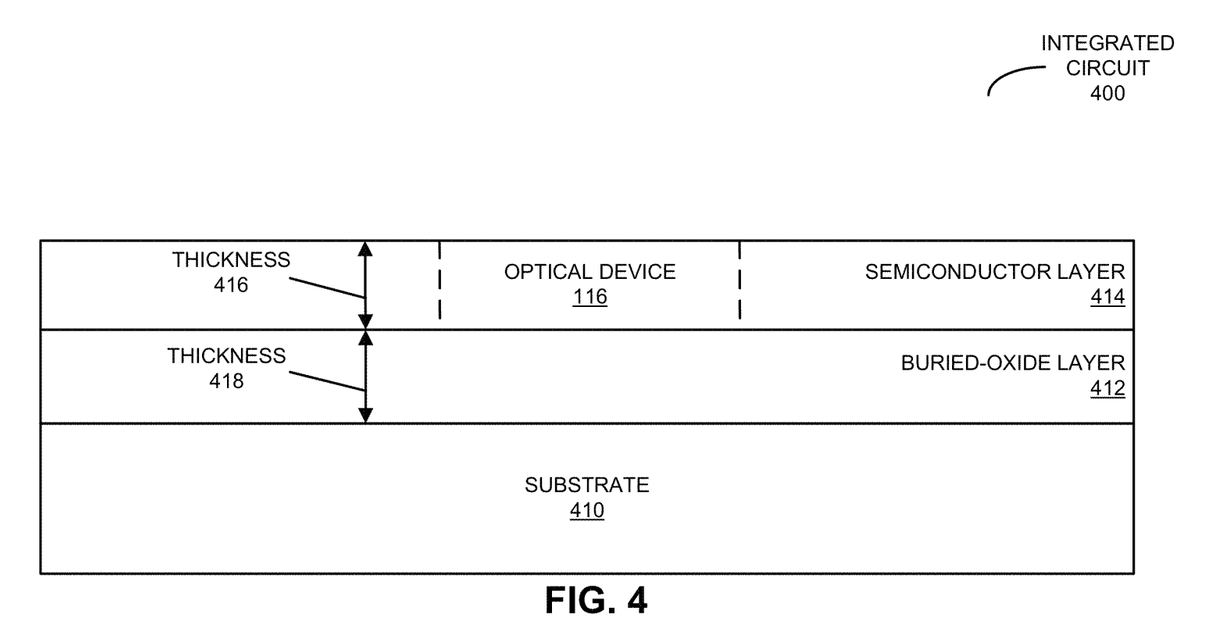
FIG. 4 is a block diagram illustrating an integrated circuit in accordance with an embodiment of the present disclosure.

As noted previously, at least a portion of the optical source is implemented using SOI technology. This is illustrated in FIG. 4, which presents a block diagram illustrating a side view of integrated circuit 400. In particular, integrated circuit 400 include: a substrate 410; a buried-oxide layer 412 disposed on substrate 410; and a semiconductor layer 414 disposed on buried-oxide layer 412, where at least a portion of the optical source (such as optical device 116) is included in semiconductor layer 414. For example, substrate 410 and/or semiconductor layer 414 may include a semiconductor, such as silicon.

In an exemplary embodiment, the set of wavelengths is between 1.1-1.7 μm, such as an optical signal having a fundamental wavelength of 1.3 or 1.55 μm. Moreover, semiconductor layer 414 may have a thickness 416 that is less than 1 μm (such as 0.2-0.3 μm), which may be able to tolerate variation in the substantially fixed spacing (δs) of 50-100 μm. Furthermore, buried-oxide layer 412 may have a thickness 418 between 0.3 and 3 μm (such as 0.8 μm). Additionally, parameters for an exemplary design of an echelle grating in optical device 116 are provided in Table 1.

TABLE 1

| | |
|---|---|
| Number of wavelengths | 8 |
| Spacing (nm) | 1.6 |
| Optical crosstalk (dB) | 20-25 |
| Rowland circle radius (μm) | 500 |
| Footprint (μm²) | 500 × 200 |
| Insertion loss | <3 dB |
| Center wavelength (nm) | 1550 |
| FSR (nm) | 12.8 |
| Thickness 416 (nm) | 300 |
| Diffraction order | 90 |
| Focal length (μm) | 350 |
| Grating pitch 126 (μm) | 25 |

Figure 5:
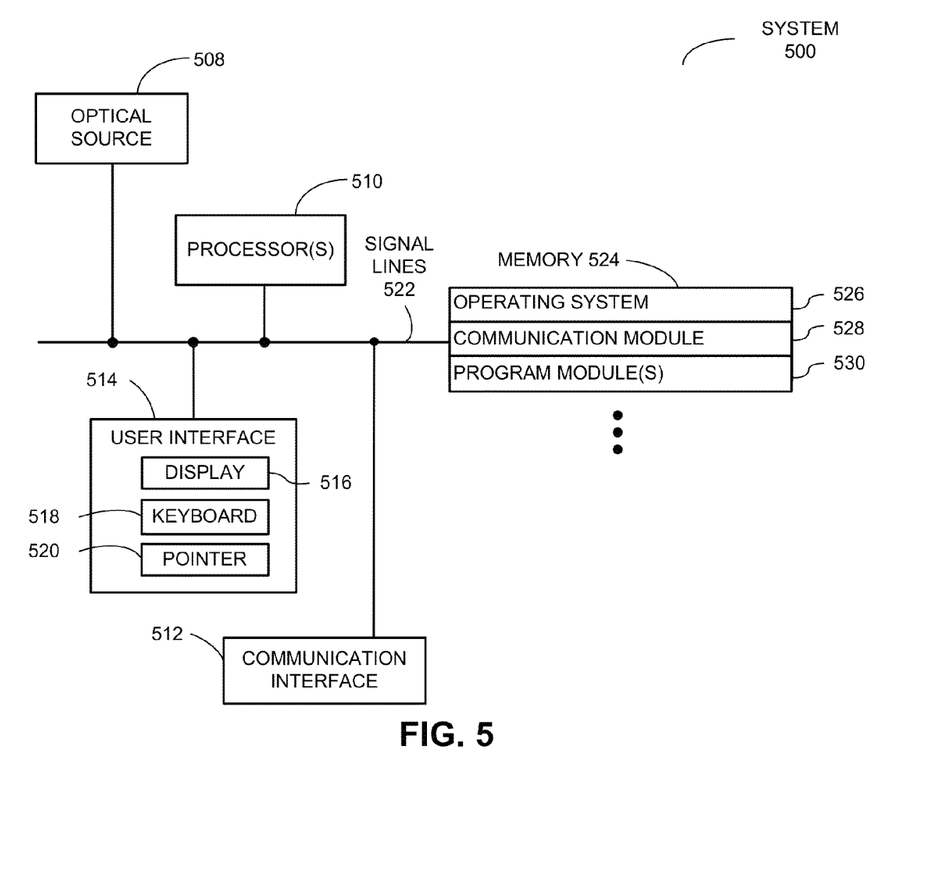
FIG. 5 is a block diagram illustrating a system that includes the optical source of FIG. 1, 2 or 3 in accordance with an embodiment of the present disclosure.

The optical source may be used in a variety of applications. This is shown in FIG. 5, which presents a block diagram illustrating a system 500 that includes optical source 508, such as optical source 100 (FIG. 1), 200 (FIG. 2) or 300 (FIG. 3). System 500 may include: one or more processors 510, a communication interface 512 and a user interface 514, which may be coupled to other components in system 500 by one or more signal lines 522. Note that the one or more processors (or processor cores) 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in system 500 may include volatile memory and/or non-volatile memory. More specifically, memory 524 may include: ROM, RAM, EPROM, EEPROM, flash, one or more smart cards, one or more magnetic disc storage devices, and/or one or more optical storage devices. Memory 524 may store an operating system 526 that includes procedures (or a set of instructions) for handling various basic system services for performing hardware-dependent tasks. Moreover, memory 524 may also store communications procedures (or a set of instructions) in a communication module 528. These communication procedures may be used for communicating with one or more computers, devices and/or servers, including computers, devices and/or servers that are remotely located with respect to the system 500.

Memory 524 may also include one or more program modules 530 (or a set of instructions). Note that one or more of program modules 530 may constitute a computer-program mechanism. Instructions in the various modules in the memory 524 may be implemented in: a high-level procedural language, an object-oriented programming language, and/or in an assembly or machine language. The programming language may be compiled or interpreted, i.e., configurable or configured, to be executed by the one or more processors (or processor cores) 510.

System 500 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet, a supercomputer, a network-attached-storage (NAS) system, a storage-area-network (SAN) system, and/or another electronic computing device.

In general, system 500 may be at one location or may be distributed over multiple, geographically dispersed locations. Moreover, some or all of the functionality of system 500 may be implemented in one or more application-specific integrated circuits (ASICs) and/or one or more digital signal processors (DSPs). Furthermore, functionality in the preceding embodiments may be implemented more in hardware and less in software, or less in hardware and more in software, as is known in the art.

The preceding embodiments may include fewer components or additional components. Moreover, although the chip package and system are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. Furthermore, features in two or more of the preceding embodiments may be combined with one another.

Figure 6:
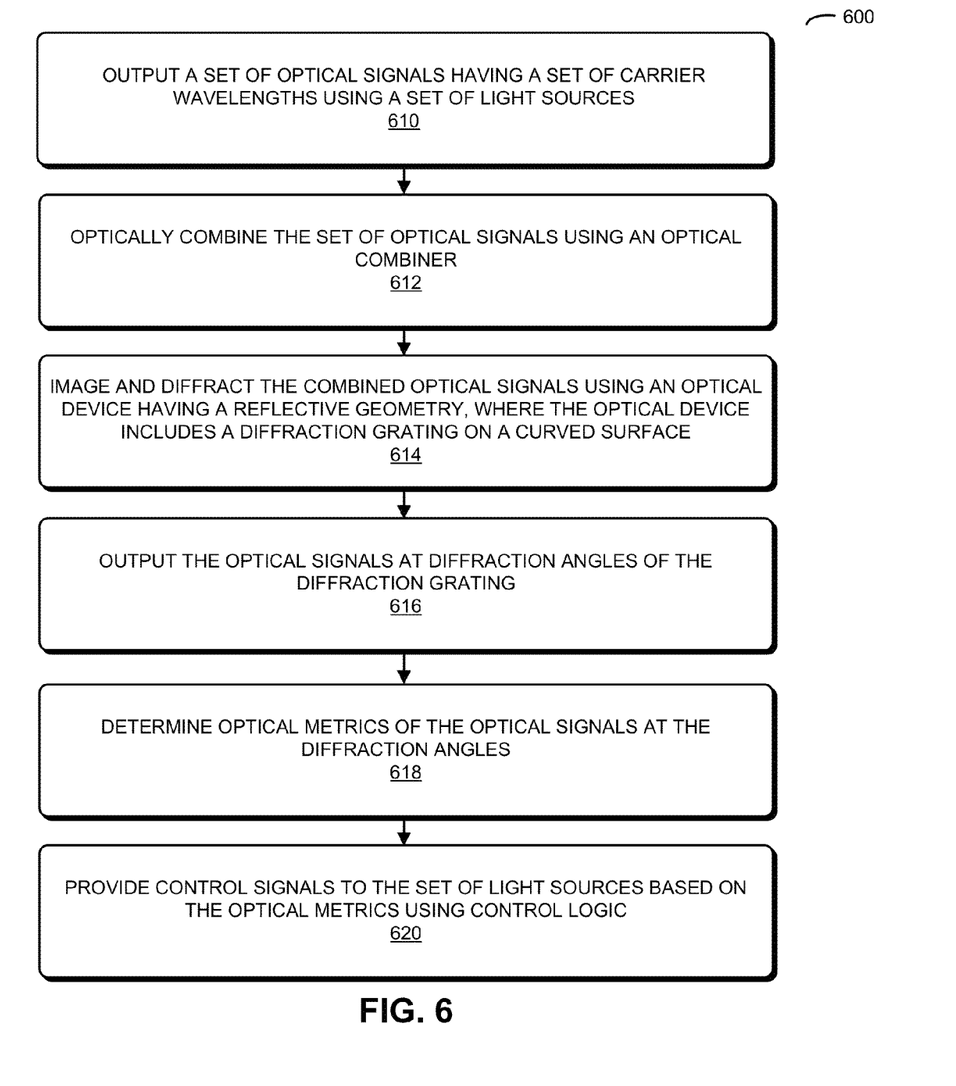
FIG. 6 is a flow chart illustrating a method for providing optical signals in accordance with an embodiment of the present disclosure.

We now describe embodiments of the method. FIG. 6 presents a flow chart 600 illustrating a method for providing optical signals, which may be performed using optical source 100 (FIG. 1), 200 (FIG. 2) or 300 (FIG. 3). During operation, a set of light sources outputs optical signals having a set of wavelengths with a substantially fixed spacing (operation 610), where a given light source outputs a given optical signal having a given wavelength in the set of wavelengths, and the set of wavelengths constitutes a wavelength comb. Then, an optical combiner combines the optical signals (operation 612). Moreover, an optical device images and diffracts the combined optical signals using a reflective geometry (operation 614), where the optical device includes a diffraction grating on a curved surface, and the optical device outputs the optical signals at corresponding diffraction angles of the diffraction grating (operation 616), thereby maintaining the wavelength comb. Next, optical detectors determine optical metrics associated with the optical signals output at the diffraction angles (operation 618), where a given optical detector determines a given optical metric associated with the given optical signal. Furthermore, control logic provides control signals to the set of light sources based on the optical metrics (operation 620), thereby maintaining a substantially fixed spacing between adjacent wavelengths in the set of wavelengths.

In some embodiments of method 600 there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical source, comprising:
a set of light sources configured to output optical signals having a set of wavelengths with a substantially fixed spacing, wherein a given light source is configured to output a given optical signal having a given wavelength in the set of wavelengths, and wherein the set of wavelengths constitutes a wavelength comb;
an optical combiner, optically coupled to the set of light sources, configured to combine a large number of optical signals;
an optical device, optically coupled to the optical combiner, that includes a diffraction grating on a curved surface, wherein the optical device is configured to image and diffract the optical signals using a reflective geometry and to output the optical signals at corresponding diffraction angles of the diffraction grating, thereby maintaining the wavelength comb;
optical detectors, optically coupled to the optical device, configured to determine optical metrics associated with the optical signals output at the diffraction angles, wherein a given optical detector is configured to determine a given optical metric associated with the given optical signal, wherein the optical detectors determine optical metrics of different optical signals in parallel; and control logic, coupled to the optical detectors and the set of light sources, configured to provide control signals to the set of light sources based on the optical metrics, thereby maintaining a substantially fixed spacing between adjacent wavelengths in the set of wavelengths.

2. The optical source of claim 1, wherein an incidence angle associated with the given diffraction order of the optical device is different than a diffraction angle associated with the given diffraction order.

3. The optical source of claim 1, wherein a grating pitch of the diffraction grating is greater than 20 μm.

4. The optical source of claim 1, wherein the optical device includes an echelle grating.

5. The optical source of claim 1, wherein the set of light sources include at least one of: a laser and a light emitting diode.

6. The optical source of claim 1, wherein the optical combiner includes cascaded 2×1 optical combiners in which two inputs are combined into an output.

7. The optical source of claim 1, wherein the optical detectors include power monitors.

8. The optical source of claim 1, wherein the control signals adjust gains and phases of the set of light sources.

9. The optical source of claim 1, wherein the control signals adjust the set of wavelengths of the optical signals output by the set of light sources, thereby substantially maintaining registration of the wavelengths in the wavelength comb output by the optical device.

10. The optical source of claim 9, wherein the set of light sources include ring resonators having resonant wavelengths; and
    wherein the control signals adjust the carrier wavelengths by adjusting the resonant wavelengths.

11. A system, comprising:
    a processor;
    a memory storing a program module that is configured to be executed by the processor; and
    an optical source, wherein the optical source includes:
    a set of light sources configured to output optical signals having a set of wavelengths with a substantially fixed spacing, wherein a given light source is configured to output a given optical signal having a given wavelength in the set of wavelengths, and wherein the set of wavelengths constitutes a wavelength comb;
    an optical combiner, optically coupled to the set of light sources, configured to combine a large number of optical signals;
    an optical device, optically coupled to the optical combiner, that includes a diffraction grating on a curved surface, wherein the optical device is configured to image and diffract the optical signals using a reflective geometry and to output the optical signals at corresponding diffraction angles of the diffraction grating, thereby maintaining the wavelength comb;
    optical detectors, optically coupled to the optical device, configured to determine optical metrics associated with the optical signals output at the diffraction angles, wherein a given optical detector is configured to determine a given optical metric associated with the given optical signal, wherein the optical detectors determine optical metrics of different optical signals in parallel; and
    control logic, coupled to the optical detectors and the set of light sources, configured to provide control signals to the set of light sources based on the optical metrics, thereby maintaining a substantially fixed spacing between adjacent wavelengths in the set of wavelengths.

12. The system of claim 11, wherein an incidence angle associated with the given diffraction order of the optical device is different than a diffraction angle associated with the given diffraction order.

13. The system of claim 11, wherein the optical device includes an echelle grating.

14. The system of claim 11, wherein the set of light sources include at least one of: a laser and a light emitting diode.

15. The system of claim 11, wherein the optical combiner includes cascaded 2×1 optical combiners in which two inputs are combined into an output.

16. The system of claim 11, wherein the optical detectors include power monitors.

17. The system of claim 11, wherein the control signals adjust gains and phases of the set of light sources.

18. The system of claim 11, wherein the control signals adjust the set of wavelengths of the optical signals output by the set of light sources, thereby substantially maintaining registration of the wavelengths in the wavelength comb output by the optical device.

19. The system of claim 18, wherein the set of light sources include ring resonators having resonant wavelengths; and
    wherein the control signals adjust the carrier wavelengths by adjusting the resonant wavelengths.

20. A method for providing optical signals, wherein the method comprises:
    outputting a large number of optical signals having a set of wavelengths with a substantially fixed spacing using a set of light sources, wherein a given light source outputs a given optical signal having a given wavelength in the set of wavelengths, and wherein the set of wavelengths constitutes a wavelength comb;
    combining the large number of optical signals;
    imaging and diffracting the combined optical signals using an optical device having a reflective geometry, wherein the optical device includes a diffraction grating on a curved surface, and wherein the optical device outputs the optical signals at corresponding diffraction angles of the diffraction grating, thereby maintaining the wavelength comb;
    determining optical metrics associated with the optical signals output at the diffraction angles using optical detectors, wherein a given optical detector determines a given optical metric associated with the given optical signal, wherein the optical metrics of different optical signals are determined in parallel; and
    providing control signals to the set of light sources based on the optical metrics, thereby maintaining a substantially fixed spacing between adjacent wavelengths in the set of wavelengths.

\* \* \* \* \*

UNITED STATES PATENT AND TRADEMARK OFFICE
CERTIFICATE OF CORRECTION

PATENT NO. : 8,737,846 B2  
APPLICATION NO. : 13/361873  
DATED : May 27, 2014  
INVENTOR(S) : Zheng et al.

Page 1 of 1

It is certified that error appears in the above-identified patent and that said Letters Patent is hereby corrected as shown below:

On title page, column 2, under Other Publications, line 12, delete "Societh," and insert -- Society, --, therefor.

Signed and Sealed this
Ninth Day of December, 2014

Michelle K. Lee
*Deputy Director of the United States Patent and Trademark Office*